(12) United States Patent
Saito et al.

(10) Patent No.: US 10,024,457 B2
(45) Date of Patent: Jul. 17, 2018

(54) THROTTLE VALVE

(71) Applicant: Koganei Corporation, Koganei-shi, Tokyo (JP)

(72) Inventors: Yutaka Saito, Koganei (JP); Ryotaro Oba, Koganei (JP)

(73) Assignee: Koganei Corporation, Tokyo (JP)

( * ) Notice: Subject to any disclaimer, the term of this patent is extended or adjusted under 35 U.S.C. 154(b) by 34 days.

(21) Appl. No.: 15/119,001

(22) PCT Filed: Aug. 28, 2014

(86) PCT No.: PCT/JP2014/072609
§ 371 (c)(1),
(2) Date: Aug. 15, 2016

(87) PCT Pub. No.: WO2015/151310
PCT Pub. Date: Oct. 8, 2015

(65) Prior Publication Data
US 2016/0356398 A1    Dec. 8, 2016

(30) Foreign Application Priority Data
Mar. 31, 2014 (JP) ................. 2014-071092

(51) Int. Cl.
*F16K 31/04* (2006.01)
*F16K 41/04* (2006.01)
(Continued)

(52) U.S. Cl.
CPC ............ *F16K 41/06* (2013.01); *F16K 1/04* (2013.01); *F16K 1/385* (2013.01); *F16K 1/54* (2013.01); *F16K 31/04* (2013.01); *F16K 31/047* (2013.01)

(58) Field of Classification Search
CPC ........ F16K 1/50; F16K 31/041; F16K 31/047; F16K 31/0655; F16K 41/04; F16K 41/06; F16H 25/20
(Continued)

(56) References Cited

U.S. PATENT DOCUMENTS 4,274,444 A * 6/1981 Ruyak ................. F16K 31/047
137/630.14
4,593,881 A    6/1986 Yoshino
(Continued)

FOREIGN PATENT DOCUMENTS

JP      5977179 A      5/1984
JP      H11-201004 A   7/1999
(Continued)

OTHER PUBLICATIONS

International Search Report for Application No. PCT/JP2014/072609, dated Dec. 2, 2014.

*Primary Examiner* — Seth W Mackay-Smith
(74) *Attorney, Agent, or Firm* — McCormick, Paulding & Huber LLP

(57) ABSTRACT

A throttle valve 10 continuously increases/decreases the flow rate of air flowing through a communication hole 17 through which a first port 11 and a second port 12 are communicated with each other, by using a throttle valve element 22. A valve seat member 15 having the communication hole 17 is attached to a housing 13. An electric motor 25 is attached to a motor housing hole 24 formed in the housing 13. The throttle valve element 22 is driven in an axial direction by a motor shaft 28 of the electric motor 25. A gap between the motor housing hole 24 and the electric motor 25 is sealed by a fixed sealing member 41 having a large diameter, and the motor shaft 28 is sealed by a rotary sealing member 42 having a small diameter, whereby the
(Continued)

throttle valve element can be driven by the electric motor having a small output.

6 Claims, 2 Drawing Sheets

(51) Int. Cl.
    *F16K 41/06*     (2006.01)
    *F16H 25/20*     (2006.01)
    *F16K 1/54*     (2006.01)
    *F16K 1/04*     (2006.01)
    *F16K 1/38*     (2006.01)

(58) Field of Classification Search
    USPC .................................................. 251/129.11
    See application file for complete search history.

(56) References Cited

U.S. PATENT DOCUMENTS

| | | | |
|---|---|---|---|
| 6,349,709 B1 * | 2/2002 | Evert .................... | F02M 25/10 123/1 A |
| 6,547,030 B1 * | 4/2003 | Nomura ................ | F16K 31/047 180/441 |
| 6,557,827 B1 * | 5/2003 | Aoki ...................... | F16K 7/18 251/313 |
| 2007/0108402 A1 * | 5/2007 | Davis .................... | F16K 31/041 251/293 |
| 2007/0240690 A1 * | 10/2007 | Nanba .................. | F16K 31/041 123/568.18 |
| 2011/0001077 A1 * | 1/2011 | Masen .................. | F16K 31/047 251/321 |
| 2013/0068976 A1 * | 3/2013 | Esveldt .................... | F16K 1/12 251/129.11 |
| 2013/0142675 A1 | 6/2013 | Nabei et al. | |
| 2014/0021384 A1 * | 1/2014 | Kabel .................. | F16K 11/044 251/129.01 |
| 2015/0316168 A1 * | 11/2015 | Lv .......................... | F16K 31/53 251/129.01 |

FOREIGN PATENT DOCUMENTS

| | | |
|---|---|---|
| JP | 2000-179705 A | 6/2000 |
| JP | 2008169863 A | 7/2008 |
| JP | 2010138941 A | 6/2010 |
| JP | 5061258 B2 | 10/2012 |
| KR | 2013-021404 A | 3/2013 |

* cited by examiner

THROTTLE VALVE

CROSS-REFERENCE TO RELATED APPLICATIONS

This application is entitled to the benefit of and incorporates by reference subject matter disclosed in International Patent Application No. PCT/JP2014/072609 filed on Aug. 28, 2014 and Japanese Patent Application No. 2014-071092 filed on Mar. 31, 2014, the contents of which are hereby incorporated by reference into this application.

TECHNICAL FIELD

The present invention relates to a throttle valve provided with a throttle valve element which is driven by an electric motor, and adapted to increase/decrease a flow rate of air flowing through a communication hole by using the throttle valve element.

BACKGROUND ART

An electric needle valve described in Patent Document 1 is known as a throttle valve which can change the flow rate of air flowing through a communication hole between an inflow port and an outflow port. This electric needle valve has: a cylindrical valve element receiving member formed with a communication hole through which a primary side port and a secondary side port is communicated with each other; and a needle valve shaft for use in changing an opening degree of the communication hole. An electric motor for driving the needle valve shaft is attached to a valve case.

Related Art Documents

Patent Documents
Patent document 1: Japanese Patent No. 5061258

SUMMARY OF THE INVENTION

Problems to be Solved by the Invention

A valve case is formed with a guide hole in which the needle valve shaft is housed and reciprocally movable in its axial direction. A screw shaft disposed inside the guide hole, that is, a rotation driving shaft has a male screw. The needle valve shaft has a female screw which is connected with the male screw, or screwed to the male screw. The guide hole is communicated with an attaching hole of an electric motor. A sealing member is attached to an outer peripheral face of the needle valve shaft, so that the sealing member seals a gap between the guide hole and the needle valve shaft.

In a case where the guide hole, that is, the valve element guide hole slidably guides the needle valve shaft, i.e., the throttle valve element in the axial direction, since the gap between the throttle valve element and the valve element guide hole is sealed with the sealing member, a great driving force, i.e., an output is required to drive the throttle valve element in the axial direction. Therefore, under the condition that the electric motor is required to have a great drive force to drive the throttle valve element, the electric motor is required to have a sufficiently large size. Therefore, it is difficult to reduce the size of the throttle valve.

An object of the present invention is to provide a throttle valve provided with a throttle valve element which can be driven by a small electric motor.

Means for Solving the Problems

A throttle valve according to the present invention, which is provided with a communication hole through which a first port and a second port are communicated with each other, and adapted to continuously increase/decrease the flow rate of air flowing through the communication hole by using a throttle valve element, the throttle valve includes: an electric motor provided with a motor shaft for driving the throttle valve element in its axial direction, and attached to a motor housing hole; a fixed sealing member having a large diameter for use in sealing a gap between the motor housing hole and the electric motor; and a rotary sealing member having a small diameter for use in sealing the motor shaft.

Effects of the Invention

A gap between the electric motor and the motor housing hole in which the electric motor is housed is sealed by a fixed sealing member, and the motor shaft is sealed by the rotary sealing member smaller in diameter than the fixed sealing member. In this manner, since two processes of sealing the gap between the electric motor and the motor housing hole and sealing the motor shaft are carried out by these small and large diameter sealing members, an excessive load is prevented from being applied to the motor shaft for driving the throttle valve element. As a result, the throttle valve element can be driven by the electric motor reduced in output power, and the electric motor can be reduced in size. In addition, the throttle valve can be reduced in size.

DESCRIPTION OF THE PREFERRED EMBODIMENTS

Figure 1:
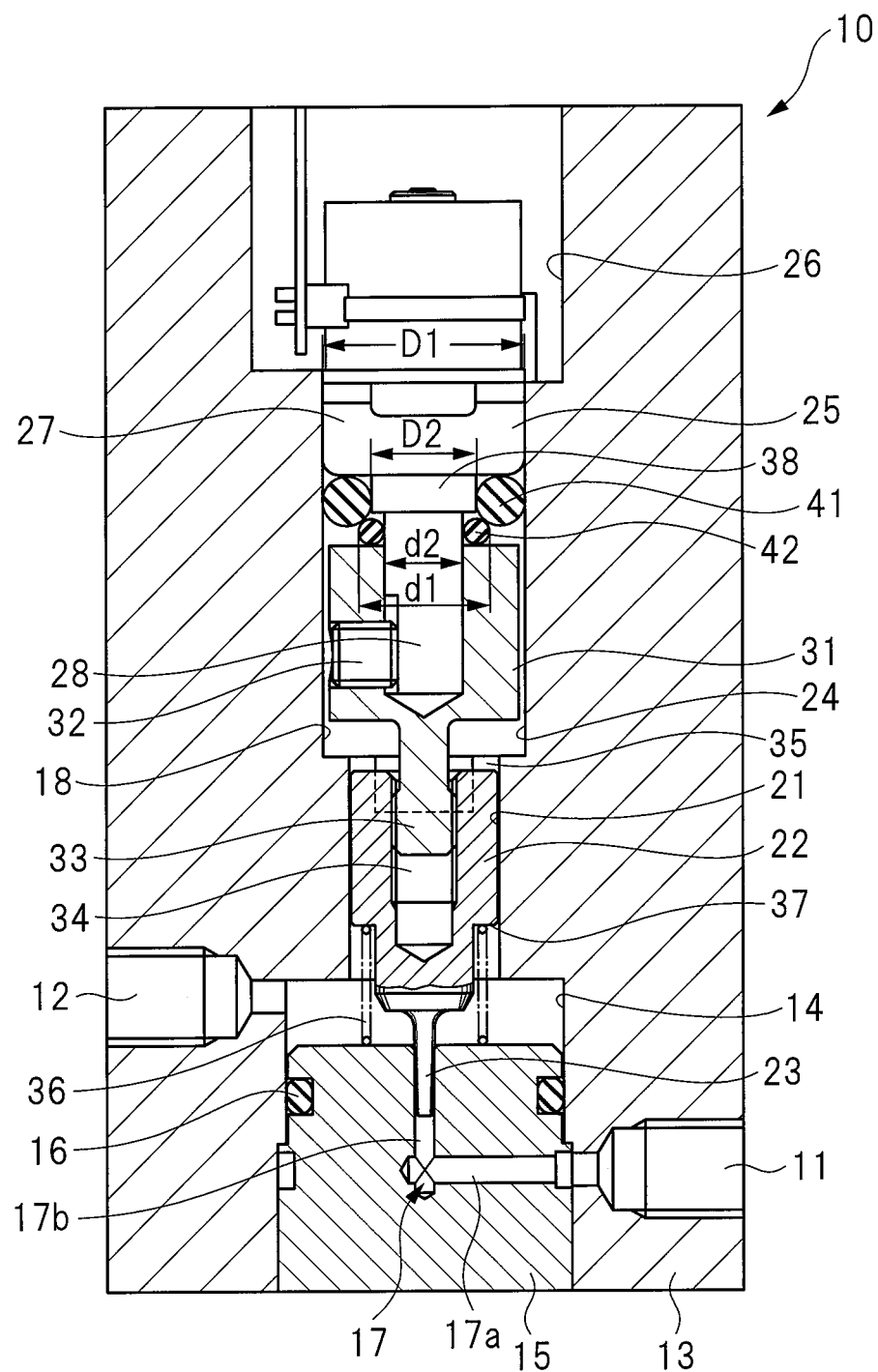
FIG. 1 is a sectional view showing a throttle valve according to one embodiment.

Hereinafter, one embodiment of the present invention will be described in detail with reference to the drawings. As shown in FIG. 1, a throttle valve 10 has a housing 13 provided with a first port 11 and a second port 12. The housing 13 is formed of a block member having a substantially rectangular parallelepiped shape. The first port 11 opens on one side face of the housing 13, and the second port 12 opens on the other side face of the housing 13. One end portion of the housing 13 is formed with a valve seat housing hole 14 having a circular cross section. A valve seat member 15 is provided in the valve seat housing hole 14. A sealing member 16 seals a gap between the outer peripheral face of the valve seat member 15 and the valve seat housing hole 14.

The valve seat member 15 is formed with a communication hole 17 through which the first port 11 and the second port 12 are communicated with each other. This communication hole 17 has a radial direction hole 17*a* and an axial direction hole 17*b*. The radial direction hole 17*a* extends in the radial direction in the valve seat member 15, and it is communicated with the first port 11. One end of the axial direction hole 17*b* is communicated with the radial direction hole 17*a,* and the other end is communicated with the valve seat housing hole 14. Supposing that the first port 11 is an inflow port, air flowing from the first port 11 is allowed to flow out to the second port 12 via the communication hole 17. On the other hand, supposing that the second port 12 is an inflow port, air flowing from the second port 12 is allowed to flow out to the first port 11 via the communication hole 17. Even if one of first port 11 and the second port 12 is selectively used as an inflow port, it is possible to adjust the flow rate of air flowing out to the other.

The housing 13 is formed with a through hole 18, and the through hole 18 extends in a longitudinal direction. One end of the through hole 18 is communicated with the valve seat housing hole 14, and the other end opens on the other end face of the housing 13. A valve element guide hole 21 is provided to the same side of the through hole 18 as the valve seat member 15. Furthermore, the valve element guide hole 21 is opened to the valve seat housing hole 14. A throttle valve element 22 is attached in the valve element guide hole 21, and movable in the axial direction. A needle 23 is formed to the tip end of the throttle valve element 22, and it is gradually tapered toward its tip end. This needle 23 is inserted into the axial direction hole 17b of the communication hole 17. The flow rate of air flowing from the inflow port to the outflow port is continuously increased or decreased by the increase or decrease of the gap between the valve seat member 15 and the needle 23.

A motor housing hole 24 is provided to the through hole 18 and adjacent to the valve element guide hole 21. An electric motor 25 is housed and attached to the motor housing hole 24. A motor insertion hole 26 is formed on the other end side of the housing 13, and communicated with the motor housing hole 24.

The electric motor 25 is inserted from the insertion hole 26, and fixed to the motor housing hole 24. The electric motor 25 is provided with a motor case 27 fixed onto the motor housing hole 24. A motor shaft 28 protrudes from the tip end of the motor case 27.

A rotation driving shaft 31 is fixed to the motor shaft 28. The rotation driving shaft 31 is fixed to the motor shaft 38 by a screw member 32. A male screw 33 is formed on the tip end of the rotation driving shaft 31. This male screw 33 is screwed to a female screw 34 formed on the throttle valve element 22, that is, they are connected to each other with screws. Therefore, when the motor shaft 28 rotates the rotation driving shaft 31, the throttle valve element 22 is moved in the valve element guide hole 21 in the axial direction. In order to prevent the throttle valve element 22 from being rotated by the rotation driving shaft 31, the throttle valve element 22 has a structure defined by width across flats. That is, two flat faces 35 are provided to the valve element guide hole 21, and flat faces which are placed in contact with the flat faces 35 are provided to the outer peripheral face of the throttle valve element 22.

The rotation of the motor shaft 28 is converted to the movement in the axial direction of the throttle valve element 22 through the rotation driving shaft 31. Without the rotation driving shaft 31, the male screw 33 may be provided to the motor shaft 28 so that the rotation of the motor shaft 28 is directly converted to the movement in the axial direction of the throttle valve element 22.

A compression coil spring 36 is attached to a gap between the throttle valve element 33 and the valve seat member 15 so that a spring force in the axial direction is applied to the throttle valve element 22. One end of this compression coil spring 36 is made in contact with the end face of the valve seat member 15, and the other end of the compression coil spring 36 is made in contact with a step portion 37 formed on the throttle valve element 22. As explained above, when the spring force in the axial direction is applied to the throttle valve element 22, without backlash caused by play of the screw, the throttle valve element 22 is driven in the axial direction by the rotation of the male screw 33 through the female screw 34. With this arrangement, the rotation angle of the motor shaft 28 in the forward direction or in the reverse direction accurately corresponds to the position of the throttle valve element 22 in the axial direction, and an opening degree of the communication hole 17 can be set with high precision.

A guide tube 38 is provided to the tip end of the motor case 27 so as to protrude from the tip end of the motor case 27, and the motor shaft 28 protrudes from the tip end of the guide tube 38.

In order to seal the gap between the motor housing hole 24 and the electric motor 25, a large-diameter fixed sealing member 41 is attached to the motor housing hole 24. The fixed sealing member 41 is made in contact with the inner peripheral face of the motor housing hole 24 and the end face of the motor case 27 so as to seal air leakage from the gap between the motor housing hole 24 and the motor case 27.

In order to seal the motor shaft 28, a small-diameter rotary sealing member 42 is attached to the motor shaft 28. The rotary sealing member 42 has an outer diameter which is smaller than the outer diameter of the fixed sealing member 41. The rotary sealing member 42 is made in contact with the motor shaft 28, the fixed sealing member 41, and the end face of the rotation driving shaft 31. The rotary sealing member 42 is rotatively driven together with the rotation driving shaft 31.

In general, when a rotation side member and a fixed side member are slidable with respect to each other, the sliding resistance is defined as follows. When the electric motor rotates the rotation side member against the sliding resistance between the rotation side member and the fixed side member, the load to be imposed on the electric motor is represented by a product of the sliding resistance per unit length between these members, the length of its sliding part, and the radius of the rotation side member. Therefore, under the condition that the sliding resistances per unit length between two members in two cases are the same as each other, when the length of its sliding part in one case is shorter than that of the other case, the load to be imposed on the electric motor is smaller than that of the other case, and when the radius of the rotation side member in one case is smaller than that of the other case, the load imposed on the electric motor is smaller than that of the other case.

In this embodiment, the center diameter d3((d1+d2)/2) of the rotary sealing member 42 is set to be smaller than the center diameter D3 ((D1+D2)/2) of the fixed sealing member 41. Here, "D1" represents the outer diameter of the large-diameter fixed sealing member 41, "D2" represents the inner diameter thereof, "d1" represents the outer diameter of the rotary sealing member 42, and "d2" represents the inner diameter thereof. As explained above, the rotary sealing member 42 is made in contact with the inner peripheral face of the fixed sealing member 41.

In this manner, the large-diameter fixed sealing member 41 seals the gap between the electric motor 25 and the motor housing hole 24. Furthermore, the small-diameter rotary sealing member 42 rotates integrally with the motor shaft 28 to seal the motor shaft 28. When the motor shaft 28 is in a rotating state, the rotary sealing member 42 is in sliding contact with only the fixed sealing member 41. Therefore, only the sliding resistance between the rotary sealing member 42 and the fixed sealing member 41 forms a load to be imposed on the motor shaft 28. However, since the large-diameter fixed sealing member 41 is fixed and does not slide, its sliding resistance does not form a load to be imposed on the motor shaft 28. Since the center diameter of the rotary sealing member 42 is smaller in comparison with the center diameter of the large-diameter fixed sealing member 41, the load to be imposed on the motor shaft 38 from the small-diameter rotary sealing member 42 through the rotation driving shaft 31 is small. Therefore, even when the electric motor 25 used in the throttle valve is small in output power, since the throttle valve element 22 is smoothly driven in the axial direction, the throttle valve 10 can be reduced in size.

Figure 2:
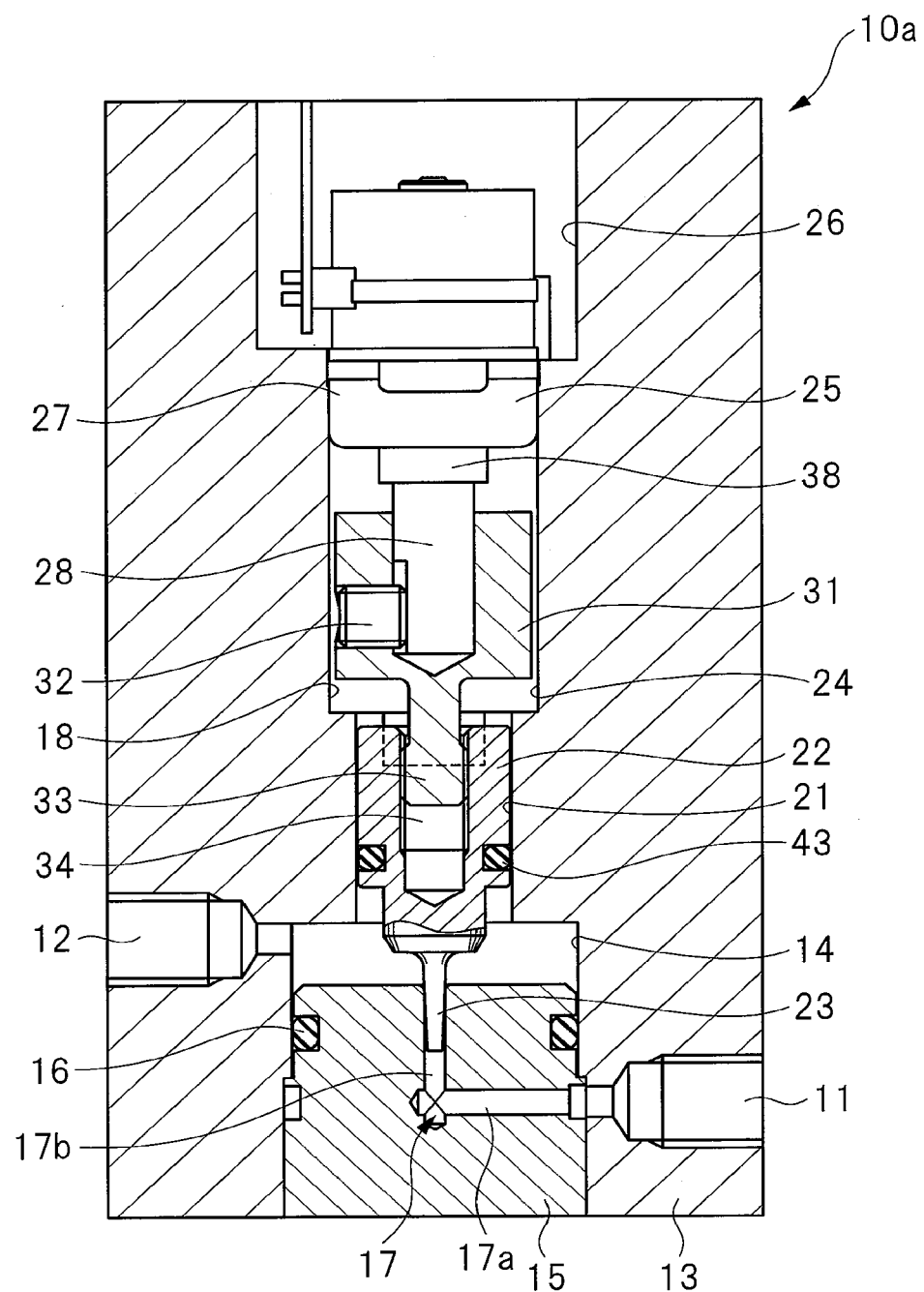
FIG. 2 is a sectional view showing a conventional throttle valve.

FIG. 2 shows a conventional throttle valve 10a as a comparative example, and members the same in function as those shown in FIG. 1 are denoted by the same reference numerals.

As shown in FIG. 2, a sealing member 43 is attached to the throttle valve element 22 so as to seal the gap between the valve element guide hole 21 and the throttle valve element 22. As a result, when the throttle valve element 22 is moved in the axial direction, sliding resistance exerted between the sealing member 43 and the valve element guide hole 21 forms a load which is applied to the electric motor 25. Furthermore, since the sealing member 43 shown in FIG. 2 is attached to the outer peripheral face of the throttle valve element 22, a force calculated by multiplying the pressure of compressed air by the cross-sectional area of the throttle valve element 22 is applied to the throttle valve element 22. Therefore, when the valve element 22 is moved in a forward direction, the above-mentioned force is also imposed as a load on the electric motor 25. Therefore, in order to drive the throttle valve element 22, it is necessary to use an electric motor 25 having a great driving force.

On the other hand, the throttle valve 10 according to this embodiment shown in FIG. 1 has a two-stage sealing structure which is formed by the large-diameter fixed sealing member 41 and the small-diameter rotary sealing member 42, and the outer diameter of the rotary sealing member 42 which is made in sliding contact with the fixed sealing member 41 is made smaller. With this structure, since the load to the electric motor is reduced, the throttle valve element 22 can be driven even by a slight driving force. Furthermore, since the sliding resistance is small, as a compression coil spring that is used against the resistance, such a coil spring having a small spring force may be sufficiently used. Therefore, since the throttle valve element 22 can be driven by a small-size electric motor 25, the throttle valve 10 can be reduced in size.

In order to seal the gap between the rotation driving shaft 31 and the motor housing hole 24 without attaching the sealing member 43 to the throttle valve element 22, a throttle valve provided with a sealing member which is attached to the rotation driving shaft 31 is prepared as one comparative example, and its driving force is then compared with that of the throttle valve according to the embodiment shown in FIG. 1. As a result, in order to attach the sealing member to the rotation driving shaft 31, it is necessary to use a sealing member having an outer diameter substantially the same as that of the fixed sealing member 41 shown in FIG. 1. Since this sealing member is made in sliding contact with the inner peripheral face of the motor housing hole 24, its length of the sliding portion and its radius on the rotation side are larger than those of the throttle valve shown in FIG. 1. Consequently, the load to be imposed on the electric motor by the sealing member is large, the electric motor 25 needs to be greater in output power, the conventional throttle valve cannot be reduced in size.

The present invention is not limited by the above-mentioned embodiment, and it is needless to say that various modifications may be made without departing from the scope of the present invention. For example, a cylindrical member in which the valve seat housing hole 14, the valve element guide hole 21 and the motor housing hole 24 are formed may be attached to the housing 13.

INDUSTRIAL APPLICABILITY

This throttle valve can be applied to control the flow rate of compressed air which is supplied to a pneumatic drive instrument.

The invention claimed is:

1. A throttle valve comprising a communication hole through which a first port and a second port are communicated with each other, and adapted to continuously vary a flow rate of air flowing through the communication hole by using a throttle valve element, the throttle valve further comprising:
   a housing having a motor housing hole;
   an electric motor provided with a motor shaft for driving the throttle valve element in its axial direction, and attached to the motor housing hole;
   a fixed sealing member having a large diameter for use in sealing a gap between the motor housing hole and the electric motor; and
   a rotary sealing member having a small diameter for use in sealing the motor shaft,
   wherein the rotary sealing member is in sliding contact with the fixed sealing member when the motor shaft is driving the throttle valve element.

2. The throttle valve according to claim 1, further comprising:
   a compression coil spring for applying a spring force in the axial direction to the throttle valve element.

3. The throttle valve according to claim 1, wherein
   the fixed sealing member is in contact with an inner peripheral face of the housing, and
   the rotary sealing member is separated from the inner peripheral face of the housing, and in contact with the fixed sealing member and the motor shaft.

4. A throttle valve comprising: a communication hole through which a first port and a second port are communicated with each other, and adapted to continuously vary a flow rate of air flowing through the communication hole by using a throttle valve element, the throttle valve further comprising:
   a housing to which a valve seat member having the communication hole is attached and in which a valve element guide hole for guiding the throttle valve element so as to freely move in an axial direction is formed;
   an electric motor having a motor shaft for driving the throttle valve element in the axial direction, which is attached to a motor housing hole formed in the housing so as to communicate with the valve element guide hole;
   a fixed sealing member having a large diameter for use in sealing a gap between the motor housing hole and the electric motor; and
   a rotary sealing member having a small diameter for use in sealing the motor shaft,
   wherein the rotary sealing member is in sliding contact with the fixed sealing member when the motor shaft is driving the throttle valve element.

5. The throttle valve according to claim 4, further comprising:
   a rotation driving shaft fixed to the motor shaft, wherein the throttle valve element comprises a female screw and the rotation driving shaft comprises a male screw that is screwed to the female screw.

6. The throttle valve according to claim 5, wherein the fixed sealing member is in contact with an inner peripheral face of the housing, and the rotary sealing member is separated from the inner peripheral face of the housing, and in contact with the fixed sealing member, the motor shaft, and the rotation driving shaft.

* * * * *